US008145494B2

(12) United States Patent
Horioka et al.

(10) Patent No.: US 8,145,494 B2
(45) Date of Patent: *Mar. 27, 2012

(54) VOICE RESPONSE SYSTEM

(75) Inventors: Masaru Horioka, Kanagawa (JP);
Yoshinori Atake, Kanagawa (JP);
Yoshinori Tahara, Kanagawa (JP)

(73) Assignee: Nuance Communications, Inc.,
Burlington, MA (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/253,849

(22) Filed: Oct. 17, 2008

(65) Prior Publication Data

US 2009/0141871 A1 Jun. 4, 2009

Related U.S. Application Data

(63) Continuation of application No. 11/673,126, filed on Feb. 9, 2007.

(30) Foreign Application Priority Data

Feb. 20, 2006 (JP) .................................. 2006-042422

(51) Int. Cl.
*G10L 21/00* (2006.01)
(52) U.S. Cl. .................. 704/275; 704/270; 704/E15.04; 379/265.11
(58) Field of Classification Search .................. 704/275, 704/270, E15.04; 379/265.11
See application file for complete search history.

(56) References Cited

U.S. PATENT DOCUMENTS

| | | | | |
|---|---|---|---|---|
| 5,357,596 A | * | 10/1994 | Takebayashi et al. | 704/275 |
| 5,577,165 A | * | 11/1996 | Takebayashi et al. | 704/275 |
| 5,745,877 A | * | 4/1998 | Nijmam et al. | 704/270 |
| 6,006,183 A | * | 12/1999 | Lai et al. | 704/235 |
| 6,173,266 B1 | * | 1/2001 | Marx et al. | 704/270 |
| 6,219,643 B1 | * | 4/2001 | Cohen et al. | 704/257 |
| 6,246,981 B1 | * | 6/2001 | Papineni et al. | 704/235 |
| 6,356,869 B1 | * | 3/2002 | Chapados et al. | 704/275 |
| 6,377,949 B1 | * | 4/2002 | Gilmour | 1/1 |
| 6,408,064 B1 | * | 6/2002 | Fedorov et al. | 379/265.06 |
| 6,434,525 B1 | * | 8/2002 | Nagisa et al. | 704/260 |

(Continued)

FOREIGN PATENT DOCUMENTS

JP 8076965 3/1996

(Continued)

OTHER PUBLICATIONS

Pieraccini et al. "Multimodal Spoken Dialogue With Wireless Devices" 2005.*

(Continued)

*Primary Examiner* — Richemond Dorvil
*Assistant Examiner* — Greg Borsetti
(74) *Attorney, Agent, or Firm* — Wolf, Greenfield & Sacks, P.C.

(57) ABSTRACT

A voice response system attempts to respond to spoken user input and to provide computer-generated responses. If the system decides it cannot provide valid responses, the current state of user session is determined and forwarded to a human operator for further action. The system maintains a recorded history of the session in the form of a dialog history log. The dialog history and information as to the reliability of past speech recognition efforts is employed in making the current state determination. The system includes formatting rules for controlling the display of information presented to the human operator.

15 Claims, 10 Drawing Sheets

U.S. PATENT DOCUMENTS

| | | | |
|---|---|---|---|
| 6,510,411 B1* | 1/2003 | Norton et al. | 704/254 |
| 6,763,104 B1* | 7/2004 | Judkins et al. | 379/265.09 |
| 6,836,537 B1* | 12/2004 | Zirngibl et al. | 379/67.1 |
| 6,879,685 B1* | 4/2005 | Peterson et al. | 379/265.11 |
| 7,024,348 B1* | 4/2006 | Scholz et al. | 703/24 |
| 7,080,323 B2* | 7/2006 | Knott et al. | 715/747 |
| 7,346,515 B2* | 3/2008 | Mizutani et al. | 704/277 |
| 7,386,454 B2* | 6/2008 | Gopinath et al. | 704/270 |
| 7,593,522 B2* | 9/2009 | Parker-Stephen | 379/265.01 |
| 7,720,684 B2* | 5/2010 | Huerta et al. | 704/257 |
| 7,945,903 B1* | 5/2011 | Castillo et al. | 717/140 |
| 2003/0091163 A1* | 5/2003 | Attwater et al. | 379/88.01 |
| 2003/0130849 A1* | 7/2003 | Durston et al. | 704/270 |
| 2004/0006475 A1* | 1/2004 | Ehlen et al. | 704/270.1 |
| 2004/0162724 A1* | 8/2004 | Hill et al. | 704/231 |
| 2004/0249636 A1* | 12/2004 | Applebaum et al. | 704/231 |
| 2005/0010418 A1* | 1/2005 | McNair et al. | 704/275 |
| 2005/0069122 A1* | 3/2005 | Lin | 379/265.01 |
| 2005/0080627 A1* | 4/2005 | Hennebert et al. | 704/270 |
| 2005/0105712 A1* | 5/2005 | Williams et al. | 379/265.02 |
| 2005/0238161 A1* | 10/2005 | Yacoub et al. | 379/265.06 |
| 2006/0095267 A1* | 5/2006 | Yano et al. | 704/275 |
| 2006/0095268 A1* | 5/2006 | Yano et al. | 704/275 |
| 2006/0129409 A1* | 6/2006 | Mizutani et al. | 704/275 |
| 2006/0147020 A1* | 7/2006 | Castillo et al. | 379/220.01 |
| 2006/0149547 A1* | 7/2006 | Miyazaki | 704/247 |
| 2006/0155526 A1* | 7/2006 | Castillo et al. | 704/1 |
| 2006/0236252 A1* | 10/2006 | Brychell et al. | 715/762 |
| 2006/0287868 A1* | 12/2006 | Ikeda et al. | 704/275 |
| 2007/0083375 A1* | 4/2007 | Lee et al. | 704/275 |
| 2007/0115920 A1* | 5/2007 | Ramakrishna | 370/352 |
| 2007/0140466 A1* | 6/2007 | Sharma | 379/235 |
| 2008/0104512 A1* | 5/2008 | Tarlton et al. | 715/706 |
| 2008/0134058 A1* | 6/2008 | Shen et al. | 715/760 |

FOREIGN PATENT DOCUMENTS

| | | |
|---|---|---|
| JP | 10322450 | 4/1998 |
| JP | 11231891 | 8/1999 |
| JP | 2002140243 | 5/2002 |
| JP | 2002202882 | 7/2002 |

OTHER PUBLICATIONS

Hastie et al. "Context-Sensitive Help for Multimodal Dialogue" 2002.*

McTear et al. "Modelling spoken dialogues with state transition diagrams: experiences with the CSLU toolkit" 1998.*

Pellom et al. "The CU Communicator: An Architecture for Dialogue Systems" 2000.*

Gerbino et al. "Managing Dialogue in a Continuous Speech Understanding System" 1993.*

* cited by examiner

| Response SentenceID | Response Sentence | Dialog State |
|---|---|---|
| 1 | Welcome to the Train Information System your Question, Please. | Service Selection in Progress |
| 2 | Fare Information is Selected your Departure Station, Please. | Fare Search Input in Progress |
| ⋮ | ⋮ | ⋮ |
| 99 | Thank you for Using the Train Information System. | Service End |

FIG.9

VOICE RESPONSE SYSTEM

TECHNICAL FIELD

The present invention relates to automated voice response systems and particularly to a system, method, and program for determining a dialog state during a user session involving such a voice response system.

BACKGROUND OF THE INVENTION

In a telephone environment, situations can exist in which a voice response system may be unable to provide an appropriate automatic response during a user call. Examples of such situations include failure of speech recognition software or a user asking a question to which the system is not programmed to respond. In such situations, the user call is typically forwarded to a human operator, who must personally deal with the user's inquiry. Being routed to an operator can be frustrating and inconvenient for the user, particularly where the operator asks the user to start over from the beginning of the inquiry. Having to make a suitable number of human operators available to avoid high levels of customer dissatisfaction also increases the service provider's costs.

Japanese Published Patent Application No. 2002-140243 discloses an automated voice response system in which each user inquiry is recorded. If speech recognition fails during a session, an e-mail message with the user recording is transmitted to a selected small office/home office (SOHO) operator, who transcribes the recording to a text file that is transmitted back to the voice response system for continuing the service. It may take a significant amount of time to complete these actions, making the approach inconvenient for the user and inefficient from the service provider's point of view.

There have been developed a variety of other systems and methods for assisting an operator when a call from a user is forwarded or a user wants to talk to the operator. For example, Japanese Published Patent Application No. 8-76965 discloses a system in which a user who is having trouble using the system can be connected to an operator who can support the user. Japanese Published Patent Application No. 10-322450 discloses a high-accuracy speech recognition system that can reduce operational burdens on operators. Moreover, Japanese Published Patent Application No. 2002-202882 discloses a system capable of automatically controlling the timing of the intervention of an operator depending on the knowledge level of a user. Additionally, Japanese Published Patent Application No. 11-231891 discloses a system that is capable of displaying text produced by conversion based on speech recognition, according to a system reliability level indicating the degree of accuracy of the conversion.

Conventionally, in an automated voice response system used for the operation of call centers, callers interact with the system in a "question-and-answer" format, as shown in Session Example 1 below.

SESSION EXAMPLE 1

System: Welcome to the train information system. Please choose an item you want to ask about. You can choose one from four items: train fare, time, first train, and last train.
User: Time.
System: Your departure station, please.
User: Tokyo.
System: Your arrival station, please.
User: Osaka.
System: Which do you want to choose, departure time or arrival time?
User: Departure time.
System: What is your expected departure time?
User: 09:00

In such a system, the flow or transition of a session is limited by restricting the vocabulary the system will recognize at each stage of processing. Since the system does not allow the entry of a new response (e.g., choice of departure time or arrival time) until the entry of an anticipated prior input (e.g., arrival station) is completed, knowledge of the inputs that are already entered are useful in gaining an understanding of the current dialog state.

Systems capable of enabling free (less constrained) dialogs have been studied and developed and are becoming widespread in recent years. This type of system enables a dialog of the type illustrated in Session Example 2 below. In this system, there is no restriction on recognizable vocabulary as there is in the conventional system. This system allows items to be entered in any order, multiple items to be entered within the same speech, and a question to be changed from one form to another during the entry.

SESSION EXAMPLE 2

System: Welcome to the train information system. Your question, please.
User: How much does it cost from Tokyo to Kyoto? (Question about fare)
System: Train fare from Tokyo to Kyoto?
User: Um . . . , no. I would like to know the time of a train to Osaka. (Question about time)
System: What is your expected departure time or arrival time?
User: I am leaving at about 21:00.
System: From Tokyo to Osaka, leaving at about 21:00?
User: Tell me the last Shinkansen. (Question about the last train)
System: The last Shinkansen from Tokyo to Osaka?
User: Yes.

In a system capable of supporting free dialog, the number of patterns of questions to be answered and the number of items that can be entered are typically much larger than those supported in a conventional voice response system. Therefore, it is difficult to quickly determine the current dialog state simply by considered previously entered responses. Even where a caller is forwarded to a human operator for help, simply displaying previously entered responses is inadequate for understanding the current dialog state, for the reasons described below. Hereinafter, "dialog state" refers to the content of an input from the user to the system, and to the point or stage that a user is at in a series of stages from the beginning to the end of a session.

For the operator to efficiently respond to the user, the system needs to present, at the time of forwarding, information relating to a dialog already established between the user and the system to the operator in an easily understandable manner. No known prior art discloses a system with capabilities sufficient to perform such a function, or a method for solving the problems described above.

SUMMARY OF THE INVENTION

The present invention solves the problems described above. The present invention makes it possible, by using a dialog history log of a voice response system at the time of forwarding to an operator, to determine and visually present, to the operator in an easily understandable manner, the content of an inquiry from a user and the current dialog state in a session between the user and the voice response system. This allows the operator to quickly learn the current dialog state and smoothly provide a response to the user.

According to one aspect of the present invention, there is provided a voice response system for responding to a spoken inquiry from a user. The voice response system includes a voice response unit for recognizing speech of the user and responding to the inquiry; a dialog history log for storing content of a dialog between the voice response unit and the user; a dialog state diagram definition file for predefining each dialog state; a dialog state determination model for estimating a dialog state between the user and the voice response unit; a dialog information analyzing unit for estimating, in response to a determination made by the voice response unit that it is impossible to respond to the inquiry, a current dialog state between the user and the voice response unit on the basis of the dialog history log, the dialog state diagram definition file, and the dialog state determination model; and a dialog information display unit for visually presenting the estimated dialog state to an operator.

Additionally, there is provided the voice response system as described above, wherein the dialog history log includes, as content of a dialog with the user, at least one of a speech recognition result for the period from the start of a service to the time of forwarding to the operator, reliability of the speech recognition result, a previously entered item in the session, a response sentence or an ID of the response sentence, information indicating the start of the service, and information indicating the end of the service.

There is further provided the voice response system as initially described, wherein the dialog state diagram definition file defines each dialog state and provides information for formatting a visual display of the dialog state and input items to be displayed, There is further provided the voice response system as initially described, wherein the dialog state determination model includes a collection of empirical data or a collection of algorithms for estimating a current dialog state from the dialog history log.

There is further provided the voice response system as initially described, wherein the dialog information analyzing unit calculates reliability of an item entered by the user and estimates an input history.

There is further provided the voice response system as initially described, wherein the dialog information display unit highlights the current dialog state on a transition diagram illustrating possible states during a session.

There is further provided the voice response system as initially described, wherein the dialog information display unit uses the dialog history log to obtain, with respect to an item entered by the user, reliability of a result of speech recognition performed by the voice response unit, and displays the item in a different color depending on the reliability.

There is further provided the voice response system as initially described, wherein the dialog information display unit uses the dialog history log to obtain, with respect to an item entered by the user, an input history of the user, and displays the item in a different character size according to the chronological order in the input history.

According to another aspect of the present invention, there is provided a voice response method for responding to a spoken inquiry from a user. The method includes a step of recognizing speech of the user and responding to the inquiry; a step of creating a dialog history log step; a dialog information analyzing step of deciding, in response to a determination made in the voice response step that it is impossible to respond to a particular inquiry, a current dialog state of the user based on the dialog history log, a dialog state diagram definition file for defining each dialog state, and a dialog state determination model for determining a dialog state of the user in the voice response step; and a dialog information display step of visually presenting the determined dialog state to an operator.

According to still another aspect of the present invention, there is provided a computer program product for providing automated voice response to a spoken inquiry from a user. The computer program includes program code embodied in a machine readable medium. The program code, when executed on a computer, causes the computer to perform a method as described above.

The present invention allows the operator to quickly understand the stage or state of the dialog at the time of forwarding to the operator. Moreover, the operator can quickly understand the reliability of each item already entered at the time of forwarding. This enables the operator, for example, to do away with the confirmation of an item with high reliability, or prompts the operator to ask the user again about an item with low reliability for confirmation. Moreover, the operator can quickly understand, for the items already entered, an input history of past entries.

BRIEF DESCRIPTION OF THE DRAWINGS

FIG. 9 is a table showing a rule for determining a dialog state from a response sentence ID according to a preferred embodiment of the present invention.

DETAILED DESCRIPTION

Embodiments of the present invention will now be described with reference to the drawings.

Figure 1:
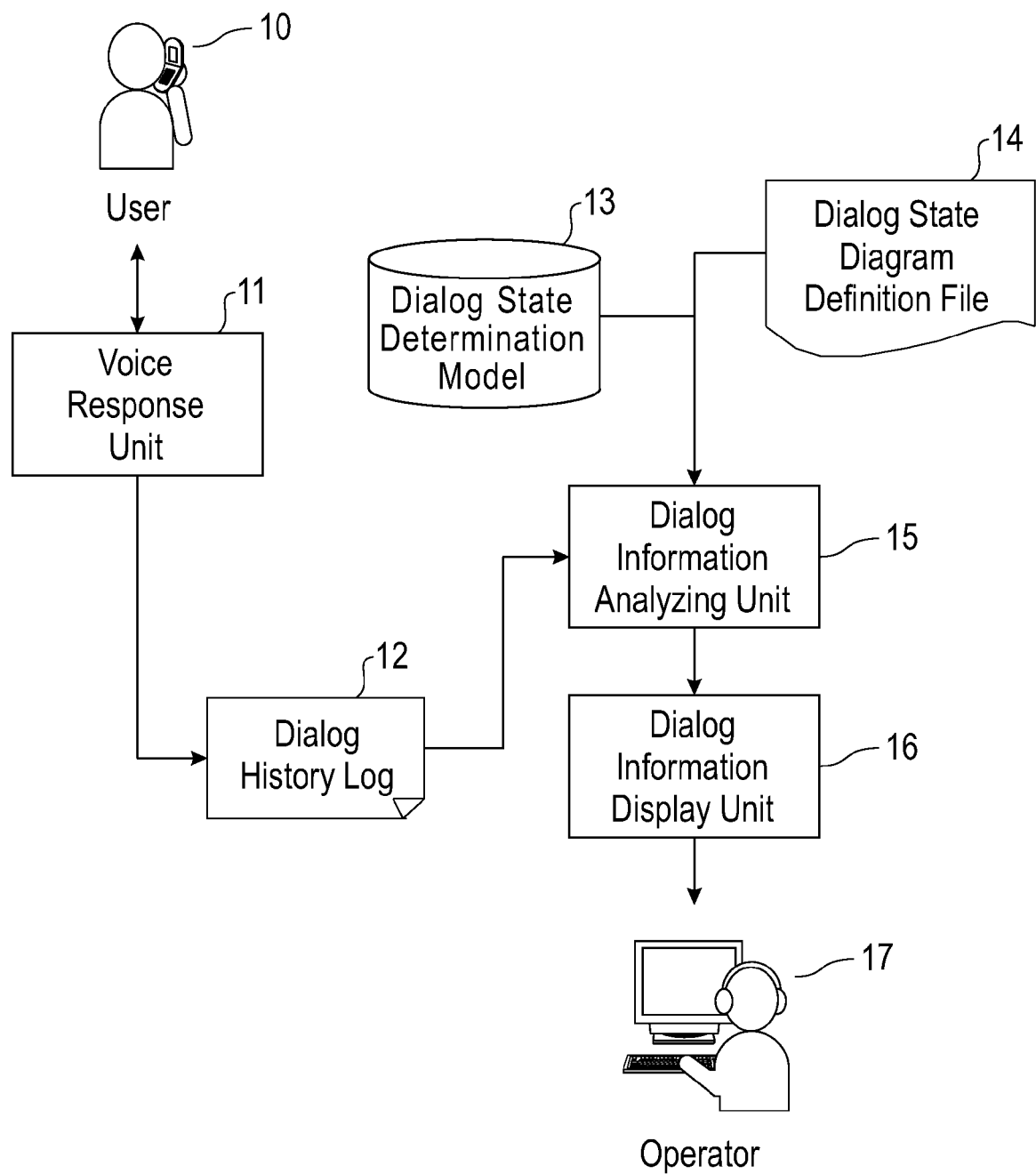
FIG. 1 is a functional block diagram of a preferred embodiment of the present invention.

FIG. 1 is a functional block diagram illustrating a voice response system 1 according to a preferred embodiment of the present invention.

As illustrated, the voice response system 1 primarily includes a voice response unit 11, a dialog history log 12, a dialog state determination model 13, a dialog state diagram definition file 14, a dialog information analyzing unit 15, and a dialog information display unit 16. These components are typically implemented in one or a plurality of computers connected to a network. This is only an exemplary configuration, and other configurations that provide functions similar to those provided by the exemplary configuration may be used.

The voice response unit 11 receives a phone call from a user 10, recognizes speech spoken by the user 10, and thus provides a voice response service that responds to user inquiries. Vocal responses to the user may also be provided by speech synthesis. Known techniques can be used to perform speech recognition and synthesis. If for some reason it is impossible to provide an automatic response to the user 10, the voice response unit 11 forwards a call from the user 10 to a human operator 17.

Dialog history log 12 is a collection of data about the results of speech recognition performed on user's speech spoken during the period from the start of the service to the time of forwarding to the operator 17, and other information such as response sentences provided by the system. For example, the following items may be recorded in the dialog history log 12.

Speech recognition result

Score associated with the speech recognition result (i.e., speech recognition score)

Item entered as a result of speech recognition (regardless of whether the recognition is correct)

Response sentence or ID representing the system response sentence (i.e., response sentence ID)

Information indicating the start and the end of the service of the system

An example of dialog history log 12 is shown below.

20050717 14:30:21 Service start
20050717 14:30:22 System response sentence ID: 1
20050717 14:30:22 System response: Welcome to the train information system. Your question please.
20050717 14:30:29 Speech recognition result: Tell me the fare, please?
20050717 14:30:29 Speech recognition score: tell=50, me=50, fare=0, please=70, all=73
20050717 14:30:29 Items entered: search content=fare, departure station=not specified, arrival station=not specified, time=not specified
20050717 14:30:33 System response sentence ID: 2
20050717 14:30:33 System response: Fare information is selected. Your departure station, please.
20050717 14:30:40 Speech recognition result: Departure from Tokyo.
20050717 14:30:40 Speech recognition score: departure=80, from=50, tokyo=90, all=78
20050717 14:30:40 Items entered: search content=fare, departure station=tokyo, arrival station=not specified
20050717 14:31:35 System response sentence ID: 99
20050717 14:31:35 System response: Thank you for using the train information system.
20050717 14:31:40 Service end The dialog state determination model 13 is a model for estimating the current dialog state from the dialog history log 12. In other words, the dialog state determination model 13 is a collection of empirical data or a collection of algorithms for estimating the current dialog state. Here, the algorithms include rules.

The dialog state diagram definition file 14 included information identifying each dialog state and its display (e.g., arrangement information), input items to be displayed, and items to be displayed in each dialog state. The details of the dialog state diagram definition file 14 will be described in examples below.

The dialog information analyzing unit 15 uses the dialog history log 12 and the dialog state determination model 13 to estimate a dialog state at the time of forwarding to the operator 17. At the same time, using information from the dialog history log 12, the dialog information analyzing unit 15 calculates the reliability of entered items and obtains an input history.

The dialog information display unit 16 visually presents information about the dialog state and input items obtained in the dialog information analyzing unit 15 to the operator 17 in an easily understandable manner (i.e., in a state diagram, characters are partially highlighted, shown in different colors, sizes, or the like).

Figure 2:
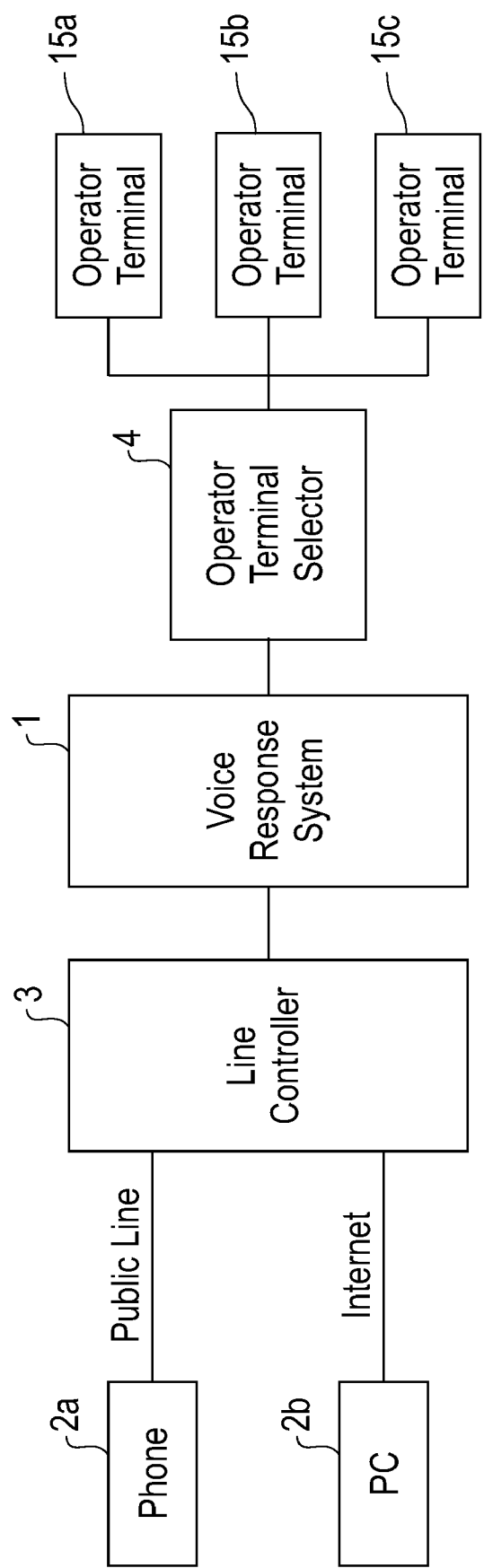
FIG. 2 is a block diagram illustrating the application of a voice response system in a specific service, according to a preferred embodiment of the present invention.

FIG. 2 illustrates the utility of the voice response system 1 in providing various services. Techniques of speech recognition can be applied to a wide range of services, including train fare/time search systems described in embodiments below, bank balance inquiry systems, telephone directory assistance systems, theater ticket reservation systems, medical service reservation systems, and helpdesk systems for responding to inquiries about products.

As illustrated in FIG. 2, the user can make a phone call from a phone 2a (e.g., a stationary phone or mobile phone) using a public line or from a personal computer (PC) 2b or the like using an Internet network, that is, from a so-called Internet protocol (IP) phone. Such a call is connected via a line controller 3 to the voice response system 1. As described above, the voice response system 1 includes one or a plurality of computer systems. If a user's speech cannot be recognized by the voice response system or in response to a request from the user, the voice response system 1 is connected to an operator terminal selector 4 that selects an operator terminal 5a, 5b, or 5c used by the most appropriate operator. Although FIG. 2 illustrates a configuration in which the operator terminal selector 4 and the voice response system 1 are separate components, the operator terminal selector 4 may be integrated into the voice response system 1.

The following refers to a train fare/time search system as one embodiment of the present invention.

Dialog states to be displayed to the operator are defined on the basis of system specifications or the like. Further, a transition diagram illustrating transitions in the process from the start to the end of the service is created.

As noted above, dialog states are defined on the basis of system specifications or the like. For example, specifications of the train fare/time search system are as follows.

The train fare/time search system provides information about train fares and arrival and departure times in response to inquiries spoken by users. The following five types of information are to be provided: fare information, time information, first train information, last train information, and commuter pass fare information. When the service starts, the system outputs a message, such as "What would you like to search for?" to prompt for the entry of a search condition. The user enters a search condition by speech, such as "I want to know the fare" or "The fare from Tokyo to Osaka". Upon completion of the entry of all conditions necessary for the search of each information, the system outputs a message, such as "The fare from Tokyo to Osaka?" to confirm the search conditions entered.

If the user responds by saying "Yes" or a recognizable equivalent, confirming that the search conditions are correct, the search is executed. Then, the search result, such as "The fare for a Shinkansen Nozomi from Tokyo to Osaka is 13,000 yen", is returned.

On the other hand, if the user responds by saying "No" or its equivalent, indicating some search condition is incorrect, the system outputs a message, such as "What is the search condition you want to correct?" to prompt for the reentry of the search condition. Once the user indicates an intended search condition was entered and the search result is returned, the system outputs a message, such as "Is there anything else you want to inquire about?" to ask if the user wants to continue using the service.

If the user responds by saying "Yes" (or the equivalent), thereby confirming a desire to continue using the service, the system outputs a message, such as "What would you like to search for?", to prompt the entry of another search condition. On the other hand, if the user responds by saying "No" or the like, the system provides a response, such as "Thank you for using the train fare/time search system" to end the service.

On the basis of the specifications of the train fare/time search system described above, the expected dialog states are defined as follows:

Service start
Service selection in progress
Fare search input in progress
Fare search confirmation in progress
Time search input in progress
Time search confirmation in progress
First train search input in progress
First train search confirmation in progress
Last train search input in progress
Last train search confirmation in progress
Commuter pass search input in progress
Commuter pass search confirmation in progress
Service continuation confirmation in progress
Service end Next, a display layout for information to be presented on the dialog information display unit 16 is created on the basis of the dialog states defined as listed above. As illustrated in an upper part 21 of FIG. 3, boxes representing respective dialog states are arranged in a chronological order between boxes representing the start and the end of the service of a voice response application. The resulting diagram may be referred to as a dialog state diagram or a transition diagram illustrating the transition of dialog states. Information about the arrangement of each dialog state is stored in the dialog state diagram definition file 14.

Figure 3:
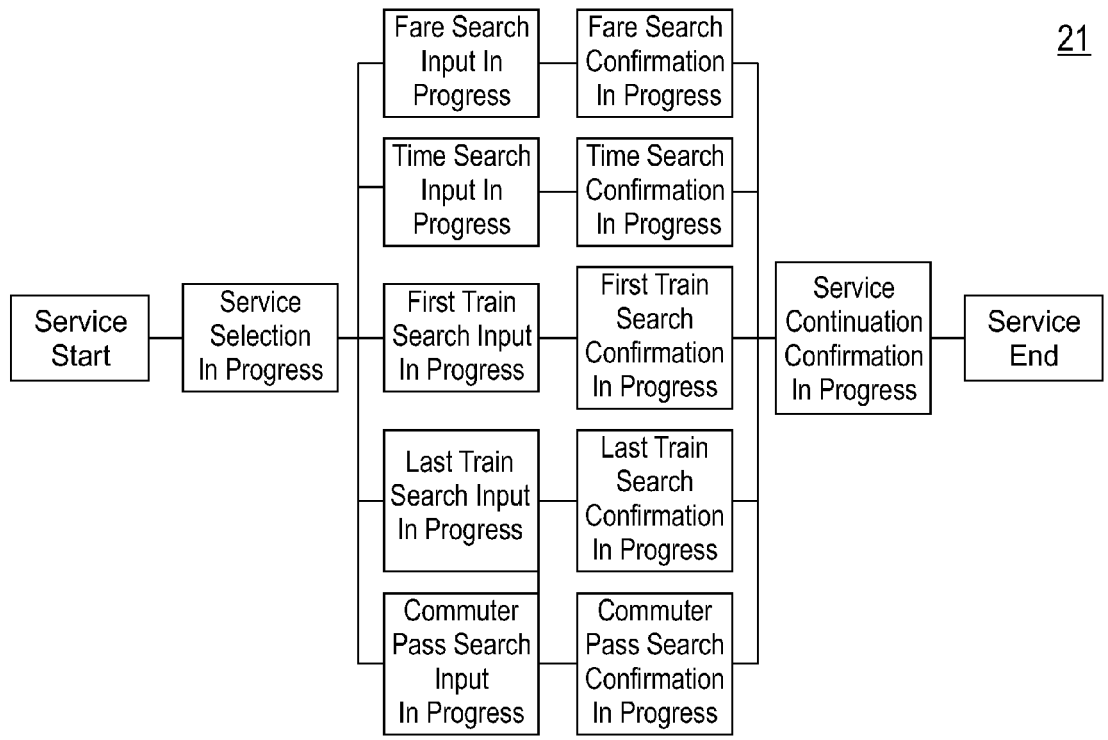
FIG. 3 illustrates a display example of dialog states and input items according to a preferred embodiment of the present invention.

Additionally, input items to be displayed to the operator are defined as illustrated in a lower part 22 of FIG. 3. Examples of input items to be displayed are listed below.

Departure station
Arrival station
Date of use
Time
Train name
Train type
Number of persons
Commuter pass type
Commuter pass duration At the same time, as shown in examples below, an association between each state and its corresponding input items to be displayed is established.

Time search input in progress={departure station, arrival station, date of use, time, train name, train type}
Commuter pass search input in progress={departure station, arrival station, commuter pass type, commuter pass duration}

Next, a procedure for creating a model for determining a current dialog state from a dialog history log of the system will be described.

First, the dialog state determination model 13 for identifying a current dialog state from a log is created. The dialog information analyzing unit 15 uses the dialog state determination model 13 at the time of forwarding to the operator to calculate the current dialog state on the basis of a log produced during the period from the start of service execution to a point immediately before the forwarding.

For example, the dialog state determination model 13 for identifying current dialog state S(t) on the basis of the most recent two response sentence IDs from time "t" and dialog state S(t−1) immediately before the current dialog state S(t) is created. Current dialog state S(t) can be expressed as follows:

$$S(t)=F(ResID(t), ResID(t-1), S(t-1))$$

where ResID(t) is a response sentence ID at time "t", and F is a function for estimating the current dialog state.

Here, Pr(Si|ResID(t), ResID(t−1)) is determined from the dialog history log and represents a probability that a dialog state is Si where ResID(t) is a response sentence ID at time "t" and ResID(t−1) is a response sentence ID at time "t−1".

Pr(Si|ResID(t)) is determined from the dialog history log and represents a probability that a dialog state is Si where ResID(t) is a response sentence ID at time "t".

Figure 4:
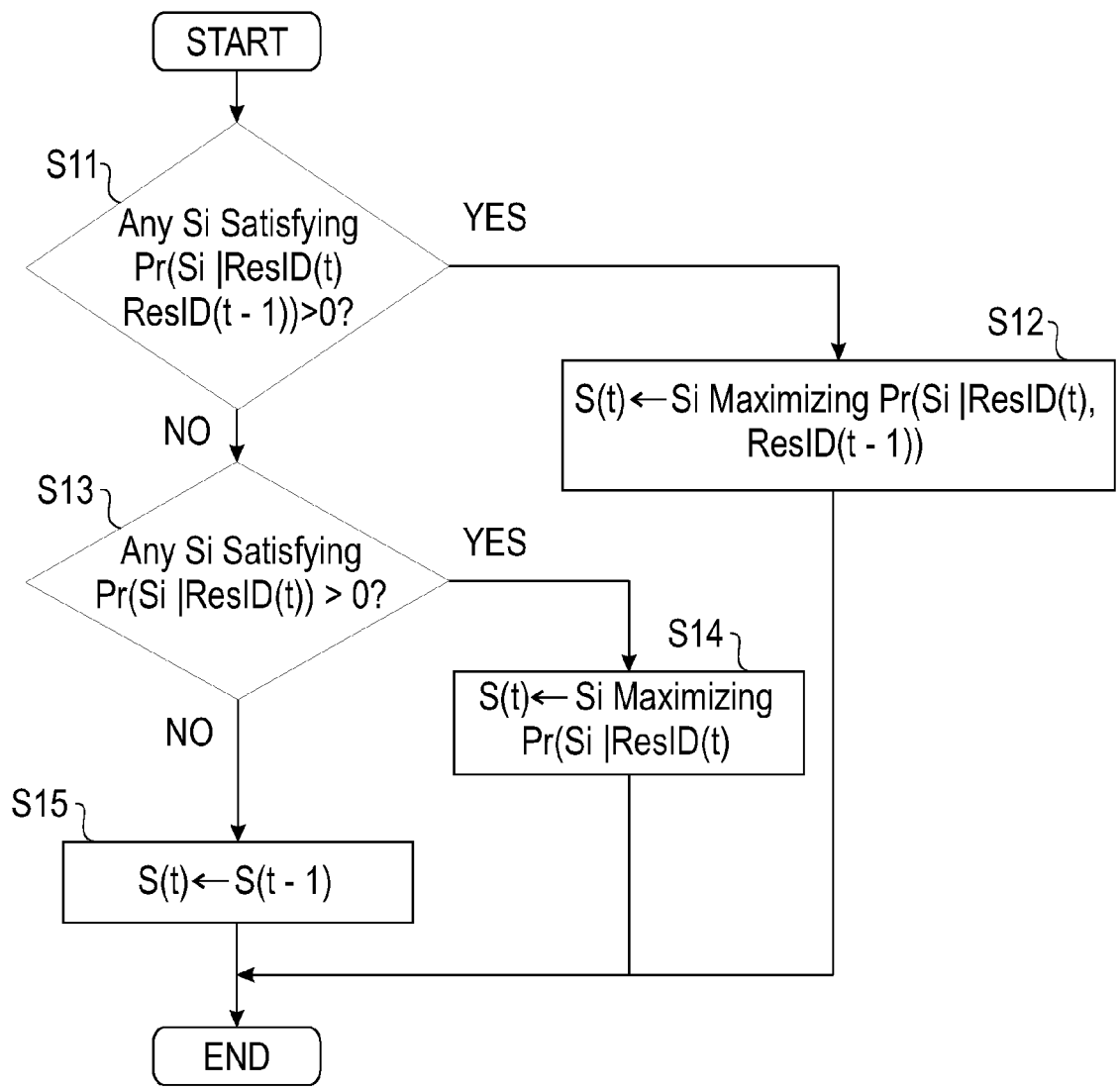
FIG. 4 is a flowchart illustrating an example of a dialog state determination model according to a preferred embodiment of the present invention.

An example of function F for estimation from the dialog history log is illustrated in a flowchart of FIG. 4.

Referring to FIG. 4, in step S11, it is determined whether there is at least one dialog state Si that satisfies a requirement that Pr(Si|ResID(t), ResID(t−1))>0. If such a dialog state exists, the process proceeds to step S12, where the entire set of dialog states satisfying the requirement is examined to identify the particular dialog state Si that maximizes Pr(Si|ResID(t), ResID(t−1)). The identified dialog state is designated to be the current dialog state. The process ends with the designation of the current dialog state.

If the determination in step S11 is "No", step S13 determines whether there is one or more Si that satisfy the requirement Pr(Si|ResID(t))>0. If one or more dialog states Si exist, step S14 selects the dialog state that maximizes Pr(Si|ResID(t)) and designates it as the current dialog state. The process ends with the designation of the current dialog state.

If no dialog state satisfying the requirement Pr(Si|ResID(t))>0 is found in step S13, the process proceeds to step S15, where the previous dialog state S(t−1) is designated to be the current dialog state S(t), ending the process.

Examples of the operation of the dialog state determination model 13 are illustrated in FIG. 4 and listed below

OPERATION EXAMPLE 1

If
Pr(State 1 |ResID(t), ResID(t−1))=0.5,
Pr(State 2 |ResID(t), ResID(t−1))=0.3, and
Pr(State 3 |ResID(t), ResID(t−1))=0.2,
max(0.5, 0.3, 0.2)=0.5 is obtained. This gives S(t)=State 1.

OPERATION EXAMPLE 2

If there is no Si that satisfies Pr(Si|ResID(t), ResID(t−1))>0, and
Pr(State 1|ResID(t))=0.2,
Pr(State 2|ResID(t))=0.7, and
Pr(State 3|ResID(t))=0.2,
max(0.2, 0.7, 0.2)=0.7 is obtained. This gives S(t)=State 2.

Generally, the dialog state determination model 13 can be expressed as S(t)=F(log for time "t0" through time "t", dialog state for time "t0" through time "t"), where "t0" is a service start time, "t" is a current time, S(t) is a current dialog state, and F is a function for determining the current dialog state. In the example described above, input parameters for F are ResIDs (response sentence IDs) and past state S. It is possible to add results of recognition of user's speech to these input parameters. The dialog state determination model 13 may be a statistical model in which learning is done from an existing log as in the case of the example above, or may be a rule-based model as described below.

The following is a description of a procedure for identifying the dialog state current at the time the call is forwarded (using the above-described steps) and for highlighting the current dialog on the transition diagram.

The dialog information display unit 16 displays a dialog state diagram illustrating a flow from the start to the end of the current system session. In the state diagram, the current dialog state identified by the dialog information analyzing unit 15 on the basis of the dialog state determination model 13 and the dialog history log 12 is highlighted. This display example is shown in FIG. 5.

Figure 5:
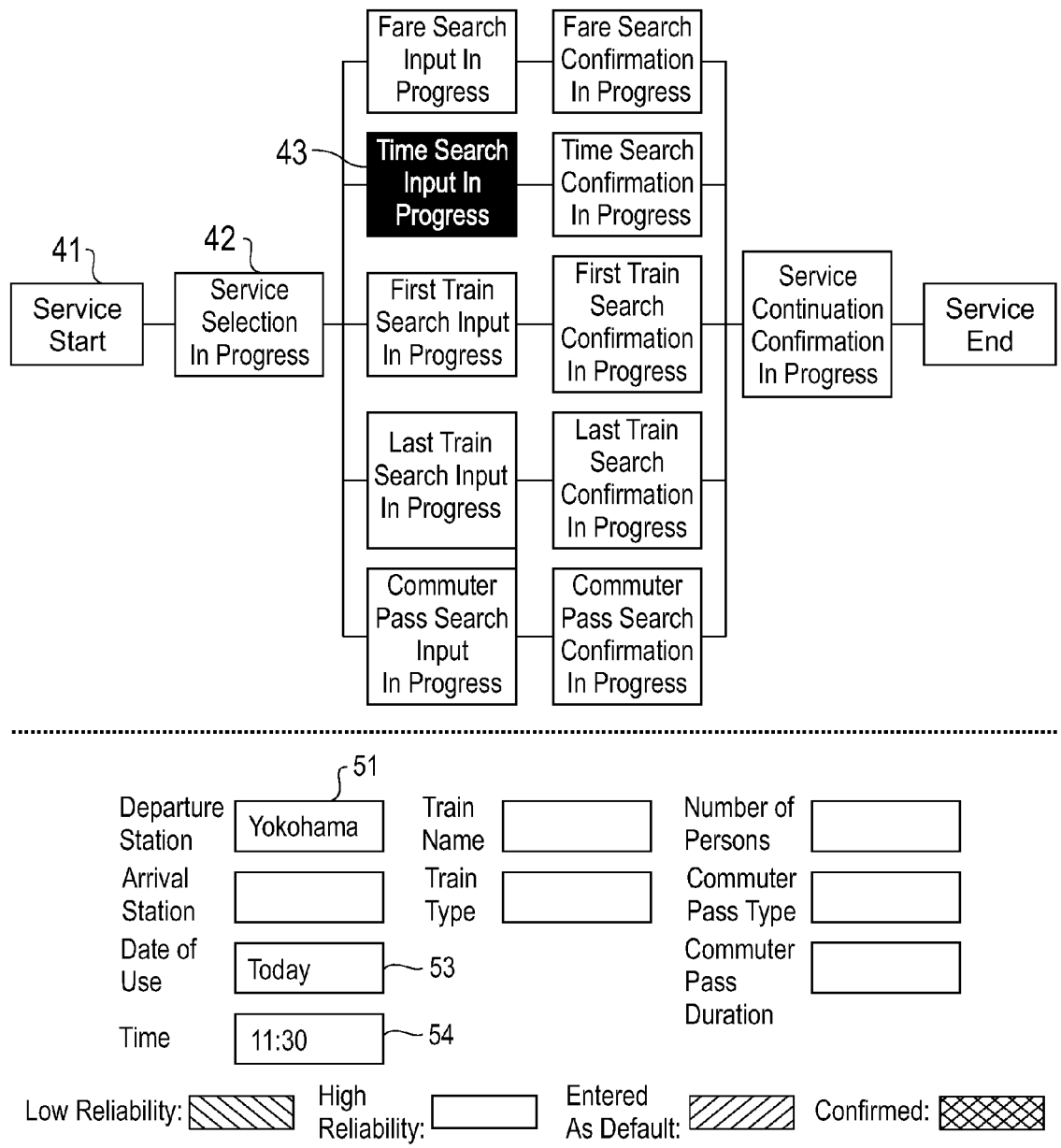
FIG. 5 illustrates a display example in which a current dialog state is highlighted according to a preferred embodiment of the present invention.

In the example in FIG. 5, "time search input in progress" block 43 is highlighted (i.e., indicated by white characters on a black background in the drawing). Therefore, it can be easily determined that currently (i.e., at the time of forwarding to the operator) the user is in the state of "time search input in progress". Additionally, "service start" 41 and "service selection in progress" 42 are highlighted (illustrated by bold frames in the drawing). Therefore, it can also be easily determined that the user has gone through the steps of "service start" 41 and "service selection in progress" 42 to reach the current state. Moreover, it can be determined from the lower part of the screen that "departure station" 51, "date of use" 53, and "time" 54 are already entered.

Figure 6:
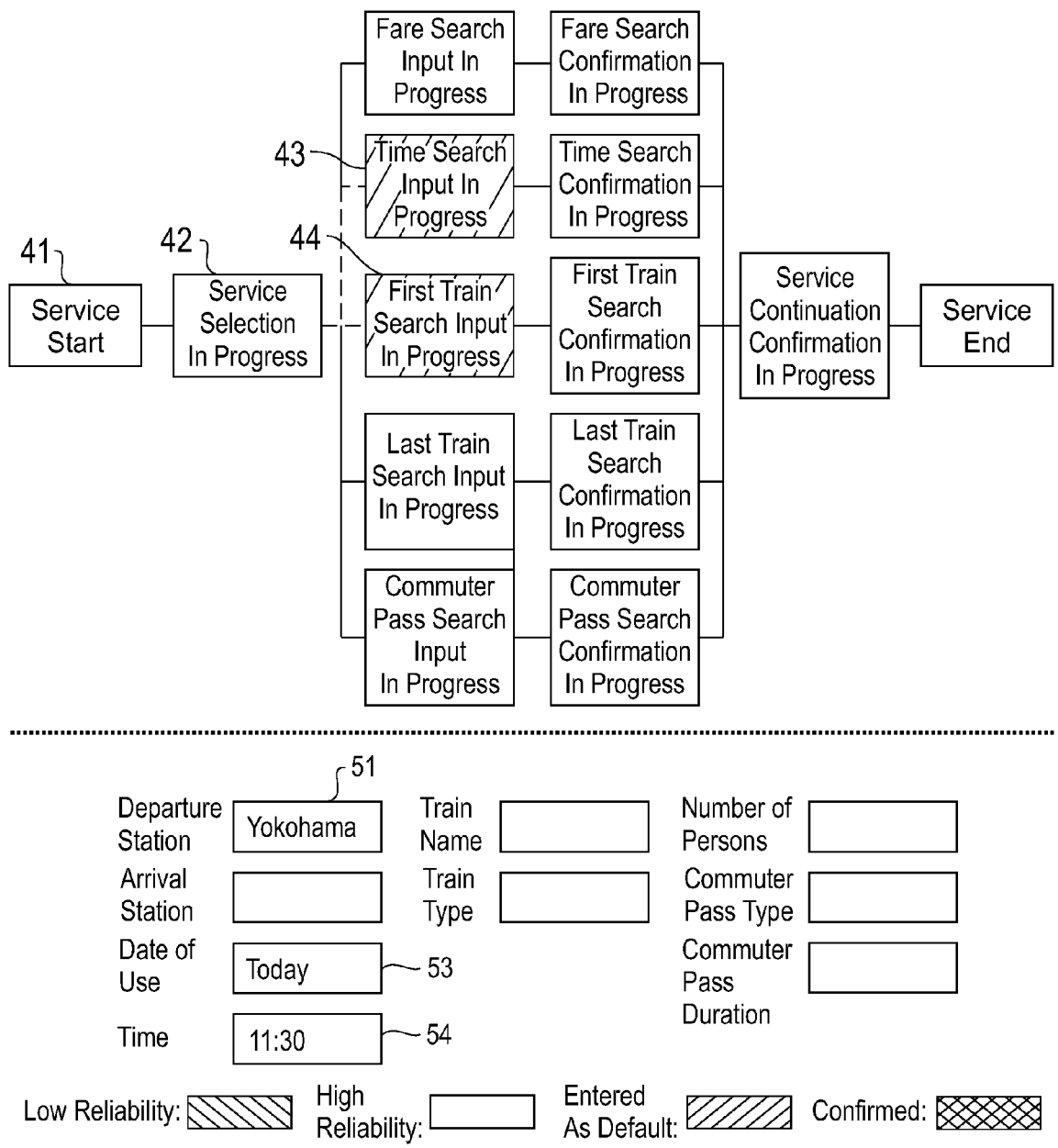
FIG. 6 illustrates a display example in which a current dialog state is ambiguous according to a preferred embodiment of the present invention.

A situation may arise where the dialog state determination model 13 will not be able to unambiguously identify a current dialog state, in other words, a plurality of states Si having the same or substantially the same maximum probability may be found in step S12 or S14 in FIG. 4. In this situation, all of the candidates for the current dialog state are highlighted. This is illustrated in an example in FIG. 6. The example in FIG. 6 illustrates that it is ambiguous whether the current dialog state is "time search input in progress" 43 or "first train search input in progress" 44.

A procedure will now be described for calculating the reliability of already entered items by using the dialog history log and for displaying the items in different colors depending on the degree of calculated reliability.

For each previously entered item, a reliability value is calculated, for example, from a past input history, a voice response engine score included in the dialog history log 12, the number of updates of the item, and a dialog state history. Then, the item is displayed according to the calculated reliability.

The definition of the reliability of an already entered item varies depending on the application used. In the illustrated system, the reliability of an entered item is defined as having one of four possible values on the basis of a speech recognition score provided by the voice response unit 11, an update history of the item, and a dialog state history.

Definition of reliability of already entered item

1. Entered as default: The item is already entered as a default value by the system.
2. Entered (low reliability): The speech recognition score of the item is below a threshold, or the item is updated more than a predetermined number of times in the most recent N times of speech.
3. Entered (high reliability): The speech recognition score of the item is equal to or higher than the threshold.
4. Confirmed: The specified information is already confirmed.

Here, "information is already confirmed" assumes there is a "process of confirming specified information" during the operation of the voice response unit 11, and the required confirmation has been provided by the user.

In Dialog Example 3 and Dialog Example 4 below, in an application for providing speech-based train information, there is a process of "confirming departure and arrival stations for a last train search" as the "process of confirming specified information". The "departure station" and "arrival station" are confirmed by the user. On the other hand, "date of use: today" entered by another speech, and "train type: Shinkansen" and "train name: Nozomi" entered as default values by the system have not yet been confirmed by the voice response unit 11.

Figure 7:
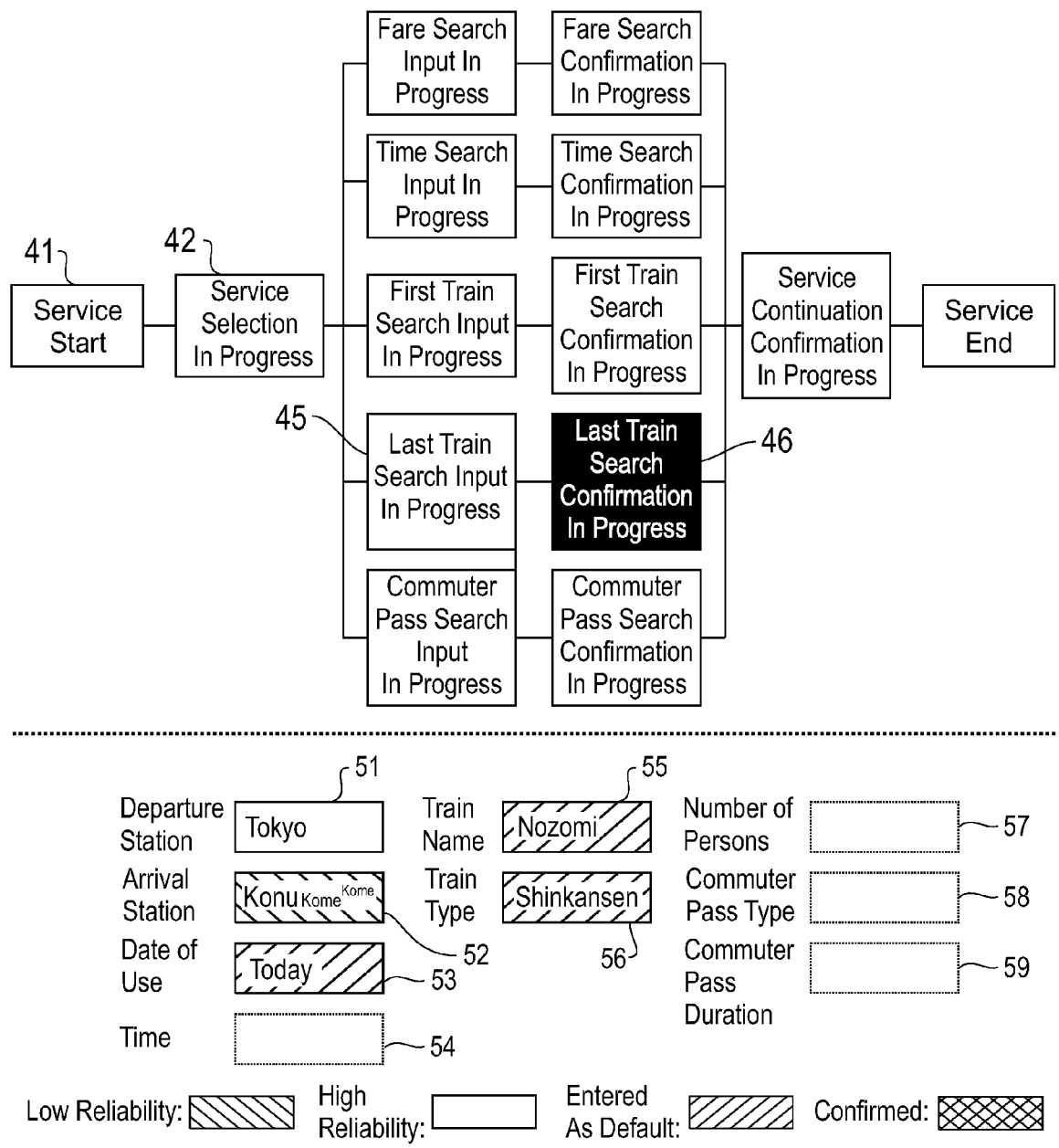
FIG. 7 illustrates a dialog state of Dialog State 1 in Dialog Example 3 according to a preferred embodiment of the present invention.
Figure 8:
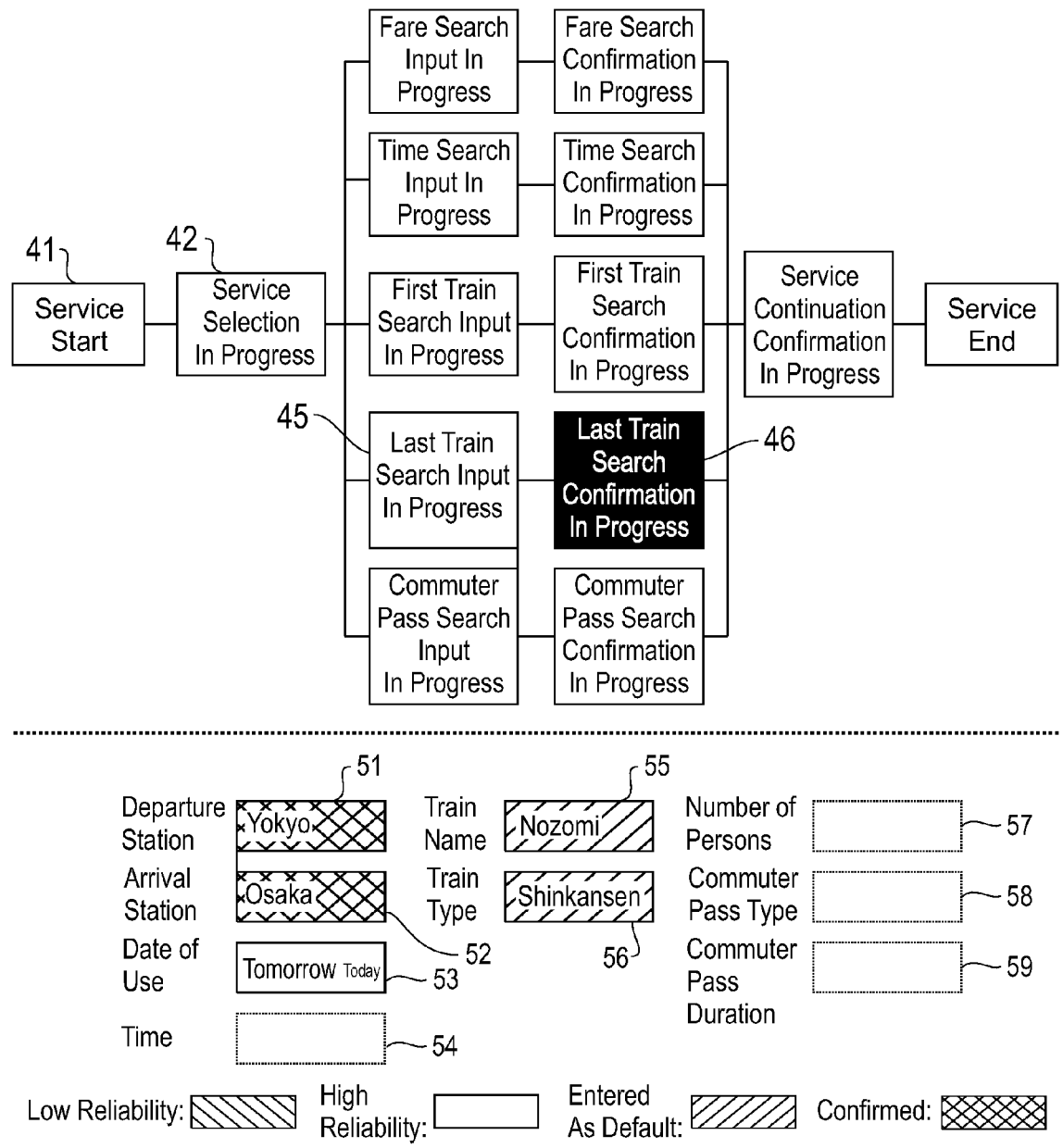
FIG. 8 illustrates a dialog state of Dialog State 2 in Dialog Example 3 according to a preferred embodiment of the present invention.

The reliability of previously entered information is calculated from the dialog history log 12 which contains information previously entered in the system by user speech. Each unit of information is displayed according to its reliability. FIG. 7 and FIG. 8 illustrate examples in which different levels of reliability are displayed in different colors (green: entered as default, yellow: entered (low reliability), white: entered (high reliability), and cyan: confirmed). In the drawings, these colors of green, yellow, white, and cyan are represented by different hatching patterns.

DIALOG EXAMPLE 3

System: Welcome to the train information system. How may I help you?
User: What is the last train from Tokyo to Kobe?
System: The last train from Tokyo to Kome?
User: To Kobe, please.
System: The last train from Tokyo to Kome?
User: To Kobe.
System: The last train from Tokyo to Konu?<Dialog State 1>

FIG. 7 illustrates a screen displaying a dialog state of Dialog State 1 in the above Example. The dialog state is "last train search confirmation in progress" 46. Of items already entered, "departure station" 51 has a high reliability, "arrival station" 52 has a low reliability, and "date of use" 53, "train name" 55, and "train type" 56 are entered as default values. Also, it is indicated that the user has gone through the states of "service start" 41, "service selection in progress" 42, and "last train search input in progress" 45 to reach the current dialog state "last train search confirmation in progress" 46. In this example, "Kobe" that the user wishes to enter as "arrival station" 52 is recognized three times as "Kome", "Kome", and "Konu" by the voice response unit 11 (in this example, three words are displayed in different character sizes in order of recognition performed on individual entries). Since it is highly likely from the number of entries that the word "Kobe" has been wrongly recognized, it is indicated that "arrival station" 52 is low in reliability. In this example, the voice response unit 11 determines that it is impossible to respond to the user's inquiry due to the low reliability of the speech recognition, and forwards the user's call to an operator.

DIALOG EXAMPLE 4

System: Welcome to the train information system. How may I help you?
User: What is the last train from Tokyo to Osaka?
System: The last train from Tokyo to Osaka?
User: Yes.
System: Are you going to travel today?

User: Tomorrow, please.

System: Are you going to travel tomorrow by Shinkansen Nozomi?

User: Can I talk to an operator, please?<Dialog State 2>

FIG. 8 illustrates a screen displaying a dialog state of Dialog State 2 in the above Example. As in the case of FIG. 7, the dialog state is "last train search confirmation in progress" 46. Of items already entered, "departure station" 51 and "arrival station" 52 are already confirmed, "date of use" 53 has a high reliability, and "train name" 55 and "train type" 56 are entered as default values. In this example, the voice response unit 11 determines that an automatic response has been disabled by the user's request, and forwards the user's call to the operator.

Other methods of displaying the different levels of reliability include highlighting items having low reliability with bold frames. Such methods can inform the operator of a possible point at which speech recognition has failed, or of items that have been entered and already confirmed.

The following is a description of a process for forwarding a representation of an input history of a previously entered item to an operator. The input history is obtained by using the dialog history.

If information is entered multiple times for a certain input item, for example, for the correction of an error in recognition, an input history of the past N entries is displayed as illustrated at "arrival station" 52 in FIG. 7. The entered items are displayed in a manner such that the older the item, the smaller the character size. The value for "N" is appropriately set according to restrictions on the display area and other factors.

An example of a rule-based dialog state determination model 13 will be described. In the rule-based dialog state determination model 13, function F obtains S(t) from a rule for determining a dialog state. The following refers to a simple example in which the dialog state S(t) at the time of forwarding is obtained from a response sentence ID at the forwarding time "t" (i.e., ResID(t)) and a dialog state at time "t−1" (i.e., S(t−1)). FIG. 9 is a table showing the relationship of a response sentence ID at the time of forwarding, and a response sentence and a dialog state corresponding to the response sentence ID.

Figure 10:
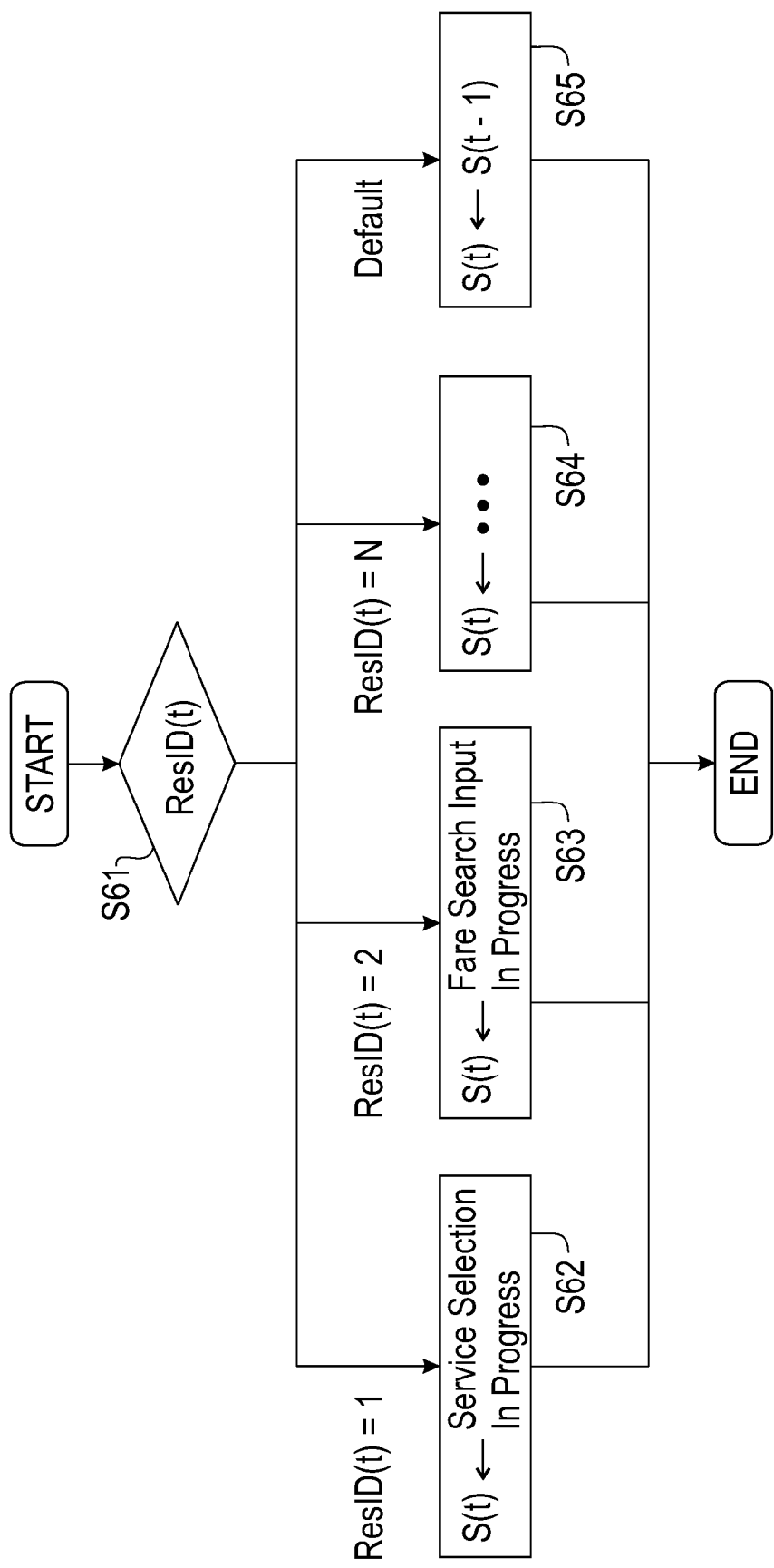
FIG. 10 is a flowchart illustrating an example of a rule-based dialog state determination model according to a preferred embodiment of the present invention.

FIG. 10 illustrates an operation of function F in the rule-based dialog state determination model 13. With respect to a response sentence ID at forwarding time "t" (i.e., ResID(t)), function F uses the relationship represented by the above-described table as a rule to determine the dialog state S(t) (steps S61 through S65). If an entered response sentence ID does not exist in the above-described table, the dialog state S(t) is S(t−1) as shown in step S65 (where S(0), that is, a default dialog state is given in advance). If, for example, a response sentence ID at the time of forwarding (i.e., ResID(t)) is "2" (step S63), its corresponding dialog state output from function F is "fare search input in progress", as shown in the table of FIG. 9.

The present invention can be implemented by hardware, software, or a combination of both hardware and software. Typical examples of implementation by combining hardware and software include implementation in a computer system having a predetermined program. In such a case, by loading the predetermined program into the computer system and executing the program, the program causes the computer system to perform processing of the present invention. The program contains a group of instructions that can be expressed in a given language, code, or notation. Such a group of instructions enables the computer system to execute specific functions directly, or after one or both of (1) conversion to another language, code, or notation and (2) reproduction in another medium, are performed. The scope of the present invention includes not only such a program, but also a program product including a medium in which such a program is recorded. A program for executing functions of the present invention can be stored in any computer readable medium, such as a flexible disk, a magneto-optical (MO) disk, a compact disk-read-only memory (CD-ROM), a digital versatile disk (DVD), a hard disk device, a ROM, a magnetic random-access memory (MRAM), or a RAM. Such a program can be downloaded from another computer system connectable via a communication line, or can be reproduced from another medium so that the program can be stored in a computer readable medium. Also, the program can be compressed or divided into a plurality of pieces and recorded in one or a plurality of recording media.

Although the present invention has been described with reference to preferred embodiments and examples thereof, the technical scope of the present invention is not limited to those described in the embodiments. Various modifications or improvements can be made to the embodiments described above. It is apparent from the appended claims that the embodiments to which such modifications or improvements have been made can also be included in the technical scope of the present invention.

What is claimed is:

1. A voice interactive system for responding to a voice inquiry from a user during a session between the user and the system, comprising:
   a combination of hardware and software configured to embody:
   a voice interactive unit for recognizing speech in the voice inquiry from the user and providing responses to the inquiry;
   a dialog history log for storing a record of a dialog between the voice interactive unit and the user;
   a dialog state diagram definition file for defining each expected dialog state for the session and information regarding at least display of a dialog state diagram;
   a dialog state determination model comprising information for estimating a current dialog state according to the dialog history log from a service start time to a current time;
   a dialog information analyzing unit, responsive to a determination by the voice interactive unit that it cannot provide a valid response to the voice inquiry from the user, for estimating the current dialog state between the user and the voice interactive unit based on the dialog history log and the dialog state determination model; and
   a dialog state display unit remote from the user for displaying the dialog state diagram, including a representation of each expected dialog state for the session, and further including a representation of at least one dialog state, other than a transition between dialog states, not yet entered during the session, according to the dialog state diagram definition file, and for visually presenting the current dialog state estimated by the dialog information analyzing unit on said dialog state diagram to an operator other than the user.

2. The voice interactive system according to claim 1, wherein the dialog history log includes at least one of:
   speech recognition results from the start of the service to occurrence of operator transfer;
   a reliability indicator for a speech recognition result;
   one or more input items of a speech recognition result;
   an answer sentence or ID thereof;

a start of service; and
an end of the service.

3. The voice interactive system according to claim 1, wherein the dialog state diagram definition file defines:
   each dialog state in the diagram state diagram and arrangement information for display of the dialog state diagram; and
   one or more input items to be displayed in each dialog state.

4. The voice interactive system according to claim 1, wherein the dialog state determination model includes an empirical data assembly or an algorithm assembly for estimating the current dialog state from the dialog history log.

5. The voice interactive system according to claim 1, wherein the dialog information analyzing unit calculates reliability of an item entered by the user and estimates an input history.

6. The voice interactive system according to claim 1, wherein the dialog state display unit visually highlights the current dialog state estimated by the dialog information analyzing unit on the dialog state diagram.

7. The voice interactive system according to claim 1, wherein the dialog state display unit uses the dialog history log to determine, with respect to an item entered by the user, reliability of a result of speech recognition performed by the voice interactive unit, and displays the item in a particular color depending on the determined reliability.

8. The voice interactive system according to claim 1, wherein the dialog state display unit uses the dialog history log to obtain, with respect to an item entered by the user, an input history of the user, and displays the item in a different character size according to its order in the input history.

9. A system for responding to a voice inquiry from a user during a session between the user and the system, the system comprising at least one processor configured to:
   recognize speech in the voice inquiry from the user, and respond to the inquiry;
   store a dialog history with the user in a dialog history log;
   responsive to a determination that the system cannot provide a valid system response to spoken input items, estimate a current dialog state of the user, based on the dialog history log and a dialog state determination model comprising information for estimating the current dialog state according to the dialog history log from the service start time to the current time; and
   display remotely from the user a dialog state diagram, including a representation of each expected dialog state for the session, and further including a representation of at least one dialog state, other than a transition between dialog states, not yet entered during the session, according to a dialog state diagram definition file defining each expected dialog state for the session and at least information regarding display of the dialog state diagram, and visually present the estimated current dialog state on the dialog state diagram to an operator other than the user.

10. The system according to claim 9, wherein the dialog history log includes at least one of:
    speech recognition results from a start of service to an occurrence of forwarding to an operator,
    a reliability for a speech recognition result,
    an already entered item in a speech recognition result,
    an answer sentence or ID thereof,
    a start of the service, and
    an end of the service.

11. The system according to claim 9, wherein the dialog state diagram definition file defines:
    each dialog state in the dialog state diagram and arrangement information for display of the dialog state diagram, and
    one or more input items to be displayed in each dialog state.

12. The system according to claim 9, wherein the dialog state determination model includes an assembly of empirical data or an assembly of algorithms for estimating the current dialog state from the dialog history log.

13. The system according to claim 9, wherein the at least one processor is further configured to calculate the reliability of an item entered by the user and take into account an input history.

14. The system according to claim 9, wherein the at least one processor is further configured to highlight the estimated current dialog state on the dialog state diagram.

15. A non-transitory computer readable medium having instructions encoded thereon that, when executed by at least one processor included in a voice interactive system, cause the at least one processor to execute a method for responding to inquiries by voice from a user during a session between the user and the system, the method comprising acts of:
    recognizing speech in the voice from the user and responding to the inquiries;
    storing a dialog history with the user in a dialog history log;
    responsive to a determination that a valid response to spoken input items cannot be provided, estimating a current dialog state between the user and a voice interactive unit based on the dialog history log, and a dialog state determination model comprising information for estimating the current dialog state according to the dialog history log from the service start time to the current time; and
    displaying a dialog state diagram, including a representation of each expected dialog state for the session, and further including a representation of at least one dialog state, other than a transition between dialog states, not yet entered during the session, according to a dialog state diagram definition file for defining each expected dialog state for the session and information regarding at least display of the dialog state diagram, and visually presenting the estimated current dialog state in the dialog state diagram to an operator.

* * * * *